(12) United States Patent
Zhou

(10) Patent No.: US 10,162,101 B2
(45) Date of Patent: Dec. 25, 2018

(54) BACKLIGHT MODULE

(71) Applicants: Shenzhen China Star Optoelectronics Technology Co., Ltd., Shenzhen (CN); Wuhan China Star Optoelectronics Technology Co., Ltd., Wuhan (CN)

(72) Inventor: Gege Zhou, Shenzhen (CN)

(73) Assignees: SHENZHEN CHINA STAR OPTOELECTRONICS TECHNOLOGY CO., LTD., Shenzhen (CN); WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 14/897,716

(22) PCT Filed: Oct. 22, 2015

(86) PCT No.: PCT/CN2015/092554
§ 371 (c)(1),
(2) Date: Dec. 11, 2015

(87) PCT Pub. No.: WO2017/063208
PCT Pub. Date: Apr. 20, 2017

(65) Prior Publication Data
US 2018/0210141 A1  Jul. 26, 2018

(30) Foreign Application Priority Data
Oct. 12, 2015  (CN) .......................... 2015 1 0659187

(51) Int. Cl.
*F21V 8/00*  (2006.01)
(52) U.S. Cl.
CPC ......... *G02B 6/0088* (2013.01); *G02B 6/0026* (2013.01); *G02B 6/0091* (2013.01)

(58) Field of Classification Search
CPC ........................... G02B 6/0088; G02B 6/0026
(Continued)

(56) References Cited

U.S. PATENT DOCUMENTS 8,588,275 B2 * 11/2013 Gelhausen ............... H03L 7/18
375/146
9,074,748 B2 * 7/2015 Yang ......................... G02B 6/42
(Continued)

FOREIGN PATENT DOCUMENTS

CN    1567048 A    1/2005
CN    1945786 A    4/2007
(Continued)

OTHER PUBLICATIONS

Office Action dated Mar. 1, 2018, by the State Intellectual Property Office of People's Republic of China in corresponding Chinese Patent Application No. 201510659187.0. (5 pages).
(Continued)

Primary Examiner — Laura Tso
(74) Attorney, Agent, or Firm — Buchanan Ingersoll & Rooney PC

(57) ABSTRACT

A backlight module includes a bottom plate, and a fixing element which is fixed at one side of the bottom plate and used for fixing a quantum tube. The fixing element includes a bottom wall, and a first lateral wall, a second lateral wall, and a third lateral wall which extend upwards from a first end, a second end, and a third end of the bottom wall respectively. The first lateral wall and the second lateral wall are arranged facing each other. The quantum tube is fixed in an accommodating space that is formed by the bottom, the first lateral, the second lateral, and the third lateral walls. In the backlight module, since the quantum tube is fixed in a
(Continued)

stable manner, a structural reliability of the backlight module can be ensured, and a high color gamut of the backlight module can be realized.

16 Claims, 3 Drawing Sheets

(58) Field of Classification Search
USPC .......................................................... 362/608
See application file for complete search history.

(56) References Cited

U.S. PATENT DOCUMENTS

| | | | | |
|---|---|---|---|---|
| 9,201,266 | B2* | 12/2015 | Hur | G02F 1/133603 |
| 9,519,097 | B2* | 12/2016 | Chen | G02B 6/0026 |
| 9,523,812 | B2* | 12/2016 | Chen | G02B 6/0055 |
| 9,645,305 | B2* | 5/2017 | Seo | G02B 6/0088 |
| 9,885,818 | B2* | 2/2018 | Kim | G02B 6/0026 |
| 2006/0279957 | A1 | 12/2006 | Kwon et al. | |
| 2012/0155115 | A1 | 6/2012 | Jang | |
| 2013/0128617 | A1* | 5/2013 | Lee | F21S 8/00 |
| | | | | 362/611 |
| 2013/0329161 | A1* | 12/2013 | Park | G02F 1/133615 |
| | | | | 349/58 |
| 2013/0336003 | A1* | 12/2013 | Yang | G02B 6/42 |
| | | | | 362/608 |
| 2015/0103291 | A1* | 4/2015 | Li | G02B 6/0023 |
| | | | | 349/62 |
| 2015/0212260 | A1* | 7/2015 | Li | G02B 6/0086 |
| | | | | 362/608 |
| 2015/0219822 | A1* | 8/2015 | Lee | G02B 6/0023 |
| | | | | 362/608 |
| 2015/0226904 | A1* | 8/2015 | Bae | G02B 6/0023 |
| | | | | 362/608 |
| 2015/0241617 | A1* | 8/2015 | Zhou | F21V 17/16 |
| | | | | 362/608 |
| 2015/0293292 | A1* | 10/2015 | Lee | G02B 6/0026 |
| | | | | 362/608 |
| 2016/0091657 | A1 | 3/2016 | Yang et al. | |
| 2016/0187563 | A1* | 6/2016 | Lee | G02B 6/0091 |
| | | | | 362/608 |
| 2016/0245987 | A1* | 8/2016 | Chen | G02B 6/0023 |
| 2016/0363712 | A1* | 12/2016 | Lee | G02B 6/0031 |
| 2017/0090093 | A1 | 3/2017 | Zhou et al. | |
| 2017/0097463 | A1 | 4/2017 | Chen et al. | |
| 2017/0139121 | A1* | 5/2017 | Zhou | G02B 6/0088 |

FOREIGN PATENT DOCUMENTS

| | | |
|---|---|---|
| CN | 102544314 A | 7/2012 |
| CN | 102563467 A | 7/2012 |
| CN | 203442699 U | 2/2014 |
| CN | 103775925 A | 5/2014 |
| CN | 204227219 U | 3/2015 |
| CN | 104808387 A | 7/2015 |
| CN | 104820311 A | 8/2015 |
| CN | 204554543 U | 8/2015 |
| CN | 104965347 A | 10/2015 |
| KR | 10-2011-0080088 A | 7/2011 |

OTHER PUBLICATIONS

Notification of Transmittal of the International Search Report and the Written Opinion of the International Searching Authority (Forms PCT/ISA/210, PCT/ISA/220, and PCT/ISA/237 dated Jun. 30, 2016, by the State Intellectual Property Office of People's Republic of China in corresponding International Application No. PCT/CN2015/092554. (12 pages).

Office Action dated Aug. 30, 2017, by the State Intellectual Property Office of People's Republic of China in corresponding Chinese Patent Application No. 201510659187.0. (9 pages).

* cited by examiner

BACKLIGHT MODULE

CROSS REFERENCE TO RELATED APPLICATION

The present application claims priority of Chinese patent application CN201510659187.0, entitled "Backlight Module" and filed on Oct. 12, 2015, the entirety of which is incorporated herein by reference.

FIELD OF THE INVENTION

The present disclosure relates to the technical field of liquid crystal display, and particularly to a backlight module.

BACKGROUND OF THE INVENTION

At present, liquid crystal display devices are widely used in various electronic products. Due to the increasingly high requirement for the color performance of the display device, a color gamut of the liquid crystal display device should be enlarged. Since backlight module is an important component of a liquid crystal display device, there is an increasingly high requirement for the color gamut of light that is emitted by the backlight module.

A traditional backlight module generally comprises a light guide plate, elastic frame and iron frame that are arranged surrounding the light guide plate, a light source, a flexible circuit board, and light-shading adhesive. The light source and the flexible circuit board are fixed on the light guide plate and the elastic frame through the light-shading adhesive, optical diaphragm is fixed on the elastic frame through light-shading double-sided adhesive, and a liquid crystal display screen is fixed on a backlight unit through double-sided adhesive. In order to improve the color gamut of the liquid crystal display device, in the traditional backlight module, quantum dot material is packaged in a glass tube so as to form a quantum tube. However, since the quantum tube can be damaged easily, a reliable component for fixing the quantum tube is important for realizing high color gamut of the backlight module.

With respect to the aforesaid technical problem, a backlight module in which the quantum tube can be fixed in a better manner is needed to realize high color gamut of the liquid crystal display device.

SUMMARY OF THE INVENTION

With respect to the technical defect in the prior art, the present disclosure provides a backlight module.

According to the present disclosure, the backlight module comprises a bottom plate, and a fixing element which is fixed at one side of the bottom plate and used for fixing a quantum tube. The fixing element comprises a bottom wall, and a first lateral wall, a second lateral wall, and a third lateral wall which extend upwards from a first end, a second end, and a third end of the bottom wall respectively. The first lateral wall and the second lateral wall are arranged facing each other. The quantum tube is fixed in an accommodating space that is formed by the bottom wall, the first lateral wall, the second lateral wall, and the third lateral wall.

In the backlight module according to the present disclosure, with the arrangement of the first lateral wall and the second lateral wall, the following two technical effects can be obtained. On the one hand, the quantum tube cannot contact the light source, so that the case that a light-emitting efficiency of the quantum tube is affected since an operational temperature of the light source rises can be avoided. On the other hand, the damage to the quantum tube by the light guide plate due to temperature change or shock can be prevented since there is a certain gap between the quantum tube and the light guide plate. With the arrangement of the third lateral wall, the quantum tube can be defined in an axial direction. With the cooperation of the first lateral wall, the second lateral wall, and the third lateral wall, the freedom degree of the quantum tube in three directions can be defined, so that the quantum tube can be fixed effectively.

Moreover, different functions of the fixing element can be realized through arranging the first lateral wall, the second lateral wall, and the third lateral wall in a reasonable manner. For example, a distance between the quantum tube and the light source, and a distance between the quantum tube and the light guide plate can be ensured through arranging a thickness of the first lateral wall and a thickness of the second lateral wall in a reasonable manner. The fixing element can accommodate quantum tube with different lengths through arranging a thickness of the third lateral wall in a reasonable manner. For another example, the fixing element can accommodate quantum tube with different shapes through arranging a shape of the first lateral wall, a shape of the second lateral wall, and a shape of the third lateral wall in a reasonable manner. In the backlight module according to the present disclosure, since the quantum tube is fixed in a stable manner, a structural reliability of the backlight module can be ensured, and a high color gamut of the backlight module can be realized.

According to some embodiments, a quantity of the fixing element is at least two, and the fixing elements are arranged at two ends of one side of the bottom plate respectively. Preferably, the quantity of the fixing element is two. According to this technical solution, the quantum tube can be effectively fixed by the fixing element in the simplest manner.

According to some embodiments, the first lateral wall is provided with a first shading part at an extending end thereof in a direction facing the second lateral wall. The second lateral wall is provided with a second shading part at an extending end thereof in a direction facing the first lateral wall. The quantum tube contacts the bottom wall, an inner surface of the first shading part, an inner surface of the second shading part, and the third lateral wall. The first shading part and the second shading part are used for restricting the freedom of the quantum tube in vertical direction, so that a movement of the quantum tube in vertical direction can be prevented.

According to some embodiments, the first shading part and the second shading part both extend towards each other until they meet with each other. According to this technical solution, on the one hand, an end of the quantum tube can be protected better, and on the other hand, the fixing element can be manufactured easily, and the production cost thereof can be reduced.

According to some embodiments, a height of the first lateral wall, a height of the second lateral wall, and a height of the third lateral wall are all at least larger than a half of a radial height of the quantum tube. According to this technical solution, not only the quantum tube can be fixed, but also the material for producing the fixing element can be saved since the first lateral wall, the second lateral wall, and the third lateral wall have a relatively small height.

According to some embodiments, the third lateral wall is provided with a third shading part at an extending end thereof in a direction facing the quantum tube. The third shading part is used for preventing the movement of the quantum tube in vertical direction.

According to some embodiments, an inner surface of the third lateral wall is perpendicular to an axis of the quantum tube. According to this technical solution, the quantum tube can be fixed better in axial direction. That is, a movement of the quantum tube in axial direction can be prevented, and the quantum tube can be fixed in a more stable manner.

According to some embodiments, the backlight module further comprises a light source that is arranged at one side of the quantum tube and a light guide plate that is arranged at the other side of the quantum tube. The quantum dot material in the quantum tube can be excited by the light that is emitted by the light source, so that the quantum tube can emit light with a higher color gamut. The light with a higher color gamut irradiates the liquid crystal display panel through the light guide plate, so that an image with a higher color gamut can be displayed on the liquid crystal display device.

According to some embodiments, the first lateral wall is provided with a fourth shading part at one side thereof far from the quantum tube, andor the second lateral wall is provided with a fifth shading part at one side thereof far from the quantum tube. The fourth shading part contacts the light guide plate, and the fifth shading part contacts the light source. On the one hand, a fixed connection between the fixing element and the light guide plate, as well as between the fixing element and the light source can be realized through the fourth shading part and the fifth shading part respectively. On the other hand, the light guide plate and the light source can be spaced from other components by the fourth shading part and the fifth shading part respectively. For example, the light guide plate and the light source can be spaced from a circuit board, so that components in the backlight module do not interfere with one another.

According to some embodiments, the fixing element is made of an elastic material. Since the fixing element is made of an elastic material, the influence of outside force on safety of the quantum tube can be avoided, and a lifetime of the quantum tube can be greatly prolonged.

Compared with the prior art, in the backlight module according to the present disclosure, the freedom of the quantum tube can be restricted in multiple directions, and thus the quantum tube can be fixed in a stable manner. With the arrangement of the fixing element in the backlight module, the following two technical effects can be obtained. On the one hand, the quantum tube cannot contact the light source, so that the case that a light-emitting efficiency of the quantum tube is affected since an operational temperature of the light source rises can be avoided. On the other hand, the damage to the quantum tube by the light guide plate due to temperature change or shock can be prevented since there is a certain gap between the quantum tube and the light guide plate. In the backlight module according to the present disclosure, since the quantum tube is fixed in a stable manner, a structural reliability of the backlight module can be ensured, and a high color gamut of the backlight module can be realized.

BRIEF DESCRIPTION OF THE DRAWINGS

The present disclosure will be illustrated in detail hereinafter with reference to the embodiments and the drawings. In the drawings.

Figure 1:
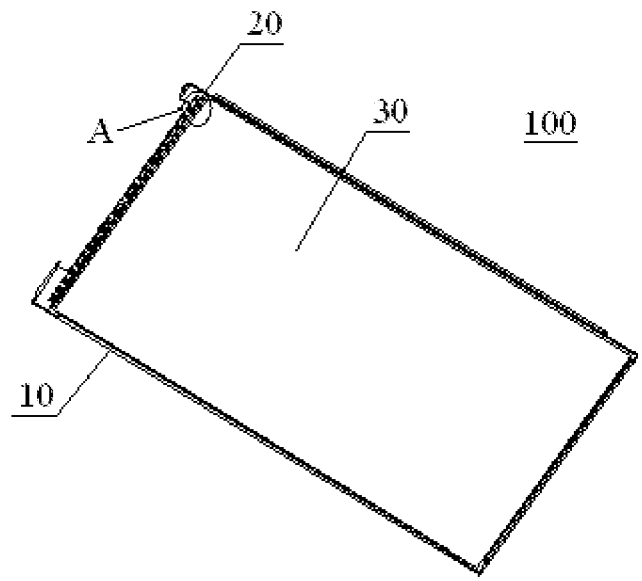
FIG. 1 schematically shows a structure of a backlight module according to the present disclosure.

In the drawings, a same component is represented by a same reference sign. The drawings are not drawn according to actual scale.

DETAILED DESCRIPTION OF THE EMBODIMENTS

The present disclosure will be further illustrated hereinafter with reference to the drawings.

The details described herein are only specific examples used for discussing the implementations of the present disclosure. The most useful and most understandable description on the principle and concept of the present disclosure is provided. The structural details which go beyond the scope of basic understanding of the present disclosure are not provided herein. Therefore, those skilled in the art can clearly understand, based on the description and the accompanying drawings, how to implement the present disclosure in different ways.

Figure 2:
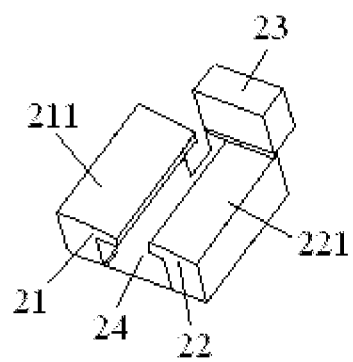
FIG. 2 schematically shows a structure of a fixing element of the backlight module according to a first embodiment of the present disclosure.

FIG. 1 schematically shows a structure of a backlight module 100 according to the present disclosure. The backlight module 100 comprises a bottom plate 10, and a fixing element 20 which is fixed at one side of the bottom plate 10 and used for fixing a quantum tube. As shown in FIG. 2, the fixing element 20 comprises a bottom wall 24, a first lateral wall 21, and a second lateral wall 22 which extend upwards from two opposite ends of the bottom wall 24 respectively, and a third lateral wall 23 which extends upwards from another end of the bottom wall 24. The quantum tube is fixed in an accommodating space that is formed by the bottom wall 24, the first lateral wall 21, the second lateral wall 22, and the third lateral wall 23.

Figure 7:
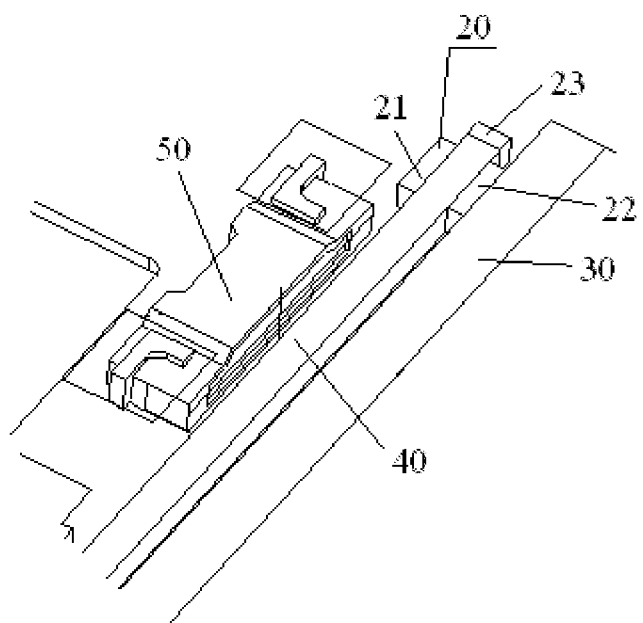
FIG. 7 is an enlarged diagram of part A in FIG. 1.

According to the present disclosure, in the backlight module 100 as shown in FIG. 1, an enlarged diagram of part A thereof is shown in FIG. 7. With the arrangement of the first lateral wall 21 and the second lateral wall 22, the following two technical effects can be obtained. On the one hand, the quantum tube 40 cannot contact the light source 50, so that the case that a light-emitting efficiency of the quantum tube 40 is affected since an operational temperature of the light source 50 rises can be avoided. On the other hand, the damage to the quantum tube 40 by the light guide plate 30 due to temperature change or shock can be prevented since there is a certain gap between the quantum tube 40 and the light guide plate 30. With the arrangement of the third lateral wall 23, the quantum tube 40 can be defined in an axial direction. With the cooperation of the first lateral wall 21, the second lateral wall 22, and the third lateral wall 23, the freedom degree of the quantum tube 40 in three directions can be defined, so that the quantum tube 40 can be fixed effectively.

Moreover, different functions of the fixing element 20 can be realized through arranging the first lateral wall 21, the second lateral wall 22, and the third lateral wall 23 in a reasonable manner. For example, a distance between the quantum tube 40 and the light source 50, and a distance between the quantum tube 40 and the light guide plate 30 can be ensured through arranging a thickness of the first lateral wall 21 and a thickness of the second lateral wall 22 in a reasonable manner. The fixing element 20 can accommodate quantum tube 40 with different lengths through arranging a thickness of the third lateral wall 23 in a reasonable manner. For another example, the fixing element 20 can accommodate quantum tube 40 with different shapes through arranging a shape of the first lateral wall 21, a shape of the second lateral wall 22, and a shape of the third lateral wall 13 in a reasonable manner. The function and arrangement of the fixing element 20 will be specifically illustrated hereinafter. In the backlight module 100 according to the present disclosure, since the quantum tube 40 is fixed in a stable manner, a structural reliability of the backlight module 100 can be ensured, and a high color gamut of the backlight module 100 can be realized.

Preferably, a quantity of the fixing element 20 is at least two, and the fixing elements 20 are arranged at two ends of one side of the bottom plate 10 respectively. Further preferably, the quantity of the fixing element 20 is two. According to this technical solution, the quantum tube 40 can be effectively fixed by the fixing element 20 in the simplest manner.

According to the embodiment as shown in FIG. 2, the first lateral wall 21 is provided with a first shading part 211 at an extending end thereof in a direction facing the second lateral wall 22. The second lateral wall 22 is provided with a second shading part 221 at an extending end thereof in a direction facing the first lateral wall 21. The quantum tube 40 contacts the bottom wall 24, an inner surface of the first shading part 211, an inner surface of the second shading part 221, and the third lateral wall 23. The first shading part 211 and the second shading part 221 are used for restricting the freedom of the quantum tube 40 in vertical direction, so that a movement of the quantum tube 40 in vertical direction can be prevented.

Figure 3:
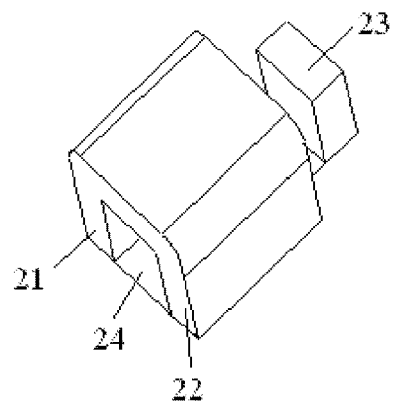
FIG. 3 schematically shows a structure of a fixing element of the backlight module according to a second embodiment of the present disclosure.

Preferably, as shown in FIG. 3, the first shading part 211 and the second shading part 221 both extend towards each other until they meet with each other. According to this technical solution, on the one hand, an end of the quantum tube 40 can be protected better, and on the other hand, the fixing element 20 can be manufactured easily, and the production cost thereof can be reduced.

Figure 4:
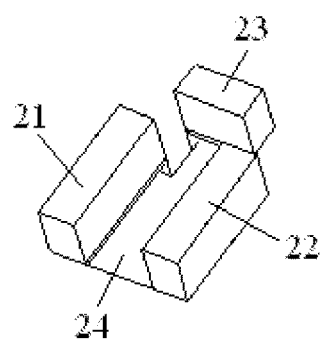
FIG. 4 schematically shows a structure of a fixing element of the backlight module according to a third embodiment of the present disclosure.

According to the embodiment as shown in FIG. 4, a height of the first lateral wall 21, a height of the second lateral wall 22, and a height of the third lateral wall 23 are all at least larger than a half of a radial height of the quantum tube 40. According to this technical solution, not only the quantum tube 40 can be fixed, but also the material for producing the fixing element 20 can be saved since the first lateral wall 21, the second lateral wall 22, and the third lateral wall 23 have a relatively small height. Preferably, the height of the first lateral wall 21, the height of the second lateral wall 22, and the height of the third lateral wall 23 are all two thirds of the radial height of the quantum tube 40.

Figure 5:
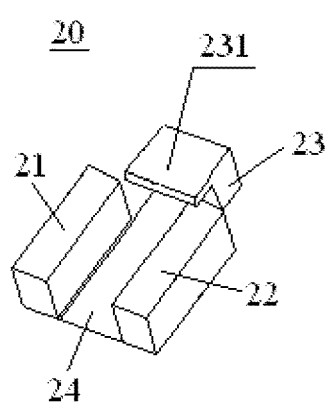
FIG. 5 schematically shows a structure of a fixing element of the backlight module according to a fourth embodiment of the present disclosure.

According to the embodiment as shown in FIG. 5, the third lateral wall 23 is provided with a third shading part 231 at an extending end thereof in a direction facing the quantum tube 40. The third shading part 231 is used for preventing the movement of the quantum tube 40 in vertical direction.

According to one preferred embodiment, an inner surface of the third lateral wall 23 is perpendicular to an axis of the quantum tube 40. According to this technical solution, the quantum tube 40 can be fixed better in axial direction. That is, a movement of the quantum tube 40 in axial direction can be prevented, and the quantum tube 40 can be fixed in a more stable manner.

According to the present disclosure, as shown in FIG. 7, the backlight module 100 further comprises a light source 50 that is arranged at one side of the quantum tube 40 and a light guide plate 30 that is arranged at the other side of the quantum tube 40. The quantum dot material in the quantum tube 40 can be excited by the light that is emitted by the light source 50, so that the quantum tube 40 can emit light with a higher color gamut. The light with a higher color gamut irradiates the liquid crystal display panel through the light guide plate 30, so that an image with a higher color gamut can be displayed on the liquid crystal display device.

Figure 6:
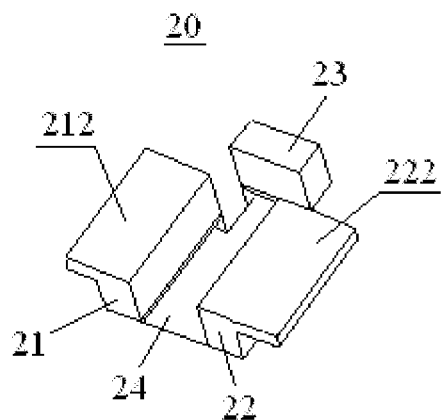
FIG. 6 schematically shows a structure of a fixing element of the backlight module according to a fifth embodiment of the present disclosure.

As shown in FIGS. 6 and 7, the first lateral wall 21 is provided with a fourth shading part 212 at one side thereof far from the quantum tube 40, and or the second lateral wall 22 is provided with a fifth shading part 222 at one side thereof far from the quantum tube 40. The fourth shading part 212 contacts the light source 50, and the fifth shading part 222 contacts the light guide plate 30. On the one hand, a fixed connection between the fixing element 20 and the light source 50, as well as between the fixing element 20 and the light guide plate 30 can be realized through the fourth shading part 212 and the fifth shading part 222 respectively. On the other hand, the light source 50 and the light guide plate 30 can be spaced from other components by the fourth shading part 212 and the fifth shading part 222 respectively. For example, the light guide plate 30 and the light source 50 can be spaced from a circuit board, so that components in the backlight module 100 do not interfere with one another.

According to the present disclosure, the fixing element 20 is preferably made of an elastic material. Since the fixing element 20 is made of an elastic material, the influence of outside force on safety of the quantum tube 40 can be avoided, and a lifetime of the quantum tube 40 can be greatly prolonged.

Compared with the prior art, in the backlight module 100 according to the present disclosure, the freedom of the quantum tube 40 can be restricted in multiple directions, and thus the quantum tube 40 can be fixed in a stable manner. With the arrangement of the fixing element 20 in the backlight module 100, the following two technical effects can be obtained. On the one hand, the quantum tube 40 cannot contact the light source 50, so that the case that a light-emitting efficiency of the quantum tube 40 is affected since an operational temperature of the light source 50 rises can be avoided. On the other hand, the damage to the quantum tube 40 by the light guide plate 30 due to temperature change or shock can be prevented since there is a certain gap between the quantum tube 40 and the light guide plate 30. In the backlight module 100 according to the present disclosure, since the quantum tube 40 is fixed in a stable manner, a structural reliability of the backlight module 100 can be ensured, and a high color gamut of the backlight module 100 can be realized.

It should be noted that, the above embodiments are described only for better understanding, rather than restricting the present disclosure. It should be understood that, the detailed description is provided according to the above embodiments in descriptive and illustrative way rather than restrictive way. Those skilled in the art can make amendments to the present disclosure within the scope as defined in the claims and without departing from the spirit and scope of the present disclosure. The present disclosure is described according to specific methods, materials, and implementations, but the present disclosure is not restricted by the details disclosed herein. On the contrary, the present disclosure is applicable for the equivalent structures, methods, and applications with the same functions as those defined in the claims.

The invention claimed is:

1. A backlight module, comprising:
   a bottom plate; and
   a fixing element which is fixed at one side of the bottom plate and used for fixing a quantum tube,
   wherein the fixing element comprises a bottom wall, and a first lateral walls, a second lateral wall, and a third lateral wall which extend upwards from a first end, a second end, and a third end of the bottom wall respectively;
   wherein the first lateral wall and the second lateral wall are arranged facing each other;
   wherein the quantum tube is fixed in an accommodating space that is formed by the bottom wall, the first lateral wall, the second lateral wall, and the third lateral wall;
   wherein the first lateral wall is provided with a first shading part at an extending end thereof in a direction facing the second lateral wall;
   wherein the second lateral wall is provided with a second shading part at an extending end thereof in a direction facing the first lateral wall; and
   wherein the quantum tube contacts the bottom wall, an inner surface of the first shading part, an inner surface of the second shading part, and the third lateral wall.

2. The backlight module according to claim 1, wherein a quantity of the fixing element is at least two, and the fixing elements are arranged at two ends of one side of the bottom plate respectively.

3. The backlight module according to claim 1, wherein the first shading part and the second shading part both extend towards each other until they meet with each other.

4. The backlight module according to claim 2, wherein the first shading part and the second shading part both extend towards each other until they meet with each other.

5. The backlight module according to claim 1, wherein a height of the third lateral wall is at least larger than a half of a radial height of the quantum tube.

6. The backlight module according to claim 2, wherein a height of the third lateral wall is at least larger than a half of a radial height of the quantum tube.

7. The backlight module according to claim 3, wherein the third lateral wall is provided with a third shading part at an extending end thereof in a direction facing the quantum tube.

8. The backlight module according to claim 4, wherein the third lateral wall is provided with a third shading part at an extending end thereof in a direction facing the quantum tube.

9. The backlight module according to claim 1, wherein an inner surface of the third lateral wall is perpendicular to an axis of the quantum tube.

10. The backlight module according to claim 2, wherein an inner surface of the third lateral wall is perpendicular to an axis of the quantum tube.

11. The backlight module according to claim 1, wherein the backlight module further comprises a light source that is arranged at one side of the quantum tube and a light guide plate that is arranged at the other side of the quantum tube.

12. The backlight module according to claim 2, wherein the backlight module further comprises a light source that is arranged at one side of the quantum tube and a light guide plate that is arranged at the other side of the quantum tube.

13. The backlight module according to claim 9,
    wherein the first lateral wall is provided with a fourth shading part at one side thereof far from the quantum tube, and the second lateral wall is provided with a fifth shading part at one side thereof far from the quantum tube; and
    wherein the fourth shading part contacts the light guide plate, and the fifth shading part contacts the light source.

14. The backlight module according to claim 10,
    wherein the first lateral wall is provided with a fourth shading part at one side thereof far from the quantum tube, and the second lateral wall is provided with a fifth shading part at one side thereof far from the quantum tube; and
    wherein the fourth shading part contacts the light guide plate, and the fifth shading part contacts the light source.

15. The backlight module according to claim 1, wherein the fixing element is made of an elastic material.

16. The backlight module according to claim 2, wherein the fixing element is made of an elastic material.

* * * * *